United States Patent [19]

Whitney et al.

[11] 4,363,880

[45] Dec. 14, 1982

[54] METHOD OF SELECTIVELY REMOVING ADSORBED CALCIUM AND MAGNESIUM FROM CATION EXCHANGE RESINS

[75] Inventors: Solon G. Whitney, Bartow; William R. Erickson, Lakeland, both of Fla.

[73] Assignee: American Petro Mart, Inc., Bartow, Fla.

[21] Appl. No.: 275,648

[22] Filed: Jun. 22, 1981

[51] Int. Cl.³ .................................................. B01J 49/00
[52] U.S. Cl. .................................. 521/26; 210/677; 210/687
[58] Field of Search ............... 210/665, 673, 677, 687; 521/26

[56] References Cited

U.S. PATENT DOCUMENTS

| | | | |
|---|---|---|---|
| 3,403,097 | 9/1968 | Yamashiki et al. | 210/687 |
| 3,494,881 | 2/1970 | Ryan et al. | 521/26 |
| 3,591,415 | 7/1971 | Zievers et al. | 210/677 |
| 3,627,705 | 12/1971 | Kingsbury | 521/26 |
| 4,207,397 | 6/1980 | Davis et al. | 210/677 |
| 4,280,904 | 7/1981 | Carlson | 210/676 |

*Primary Examiner*—Ivars C. Cintins

[57] ABSTRACT

Adsorbed calcium is selectively removed from cation exchange resins in the presence of adsorbed magnesium by eluting the resin with aqueous sulfuric acid saturated with $CaSO_4$ and undersaturated with $MgSO_4$ to obtain a solution supersaturated with $CaSO_4$ from which the $CaSO_4$ can be readily precipitated. The magnesium is subsequently removed from the resin by eluting with aqueous sulfuric acid, such as 20–70% $H_2SO_4$. The method is advantageously used in the regeneration of cation exchange resins, such as the loaded resins used for treatment of phosphate rock-derived phosphoric acid.

8 Claims, 1 Drawing Figure

METHOD OF SELECTIVELY REMOVING ADSORBED CALCIUM AND MAGNESIUM FROM CATION EXCHANGE RESINS

BACKGROUND AND PRIOR ART

Process and apparatuses have been previously developed for treating phosphoric acid to remove excess magnesium and calcium using fixed bed or moving folded bed cation exchange system. In the later connection, reference is made to the system disclosed in U.S. patent application Ser. No. 7,980, filed Jan. 31, 1979, and now U.S. Pat. No. 4,280,904, for "High Capacity Folded Moving Bed Ion Exchange Apparatus and Method for Treating Phosphoric Acid", which application has a common assignee with the present application, the assignee being American Petro Mart, Inc. An improvement in the system of that application is described in the application filed on even date with the present application, entitled "Method and Apparatus for Folded Moving Bed Ion Exchange System". In such systems, it is necessary to regenerate the cation exchange resin by removing the adsorbed magnesium and calcium. However, it has been found that the simultaneous elution of the magnesium and calcium can cause operational difficulties because of the low solubility of calcium sulfate in the aqueous sulfuric acid eluting solution. The calcium sulfate in the eluate tends to be saturated or supersaturated, and calcium sulfate precipitate forms within the resin beds being regenerated and in the pores of the resin beds.

Where the eluting solution is dilute sulfuric acid (15–20% $H_2SO_4$) and a relatively high flow rate is employed through the resin bed being regenerated, the problems caused by calcium sulfate precipitation can be somewhat alleviated. However, it has been found more desirable to employ relatively concentrated sulfuric acid as the eluate (viz. 20–70% $H_2SO_4$) and with high concentrations a slower flow rate through the bed is desirable to avoid subjecting the resin beads to fracturing concentrations of sulfuric acid. Therefore, it would be desirable to selectively remove cations, such as calcium ions, from the cation exchange resin prior to the removal of magnesium therefrom. The method of the present invention is believed to provide a novel and highly advantageous way of meeting this need. The method can also be used for processing solutions containing other cations, besides magnesium in admixture with calcium ions.

SUMMARY OF INVENTION

The method of the present invention takes advantage of the fact that in dilute solutions of sulfuric acid calcium sulfate has a low solubility while magnesium sulfate has a relatively high solubility. It also utilizes the known phenomenon that hydrogen will exchange for calcium when a cation exchange resin with adsorbed calcium is contacted with a sulfuric acid solution of sufficient concentration, even though the solution is saturated with calcium sulfate. This exchange results in the production of a supersaturated solution of calcium sulfate from which the calcium sulfate can be precipitated. As far as is known, however, this prior knowledge has not been applied to any method similar to the one of the present invention.

In the method of the present invention, calcium is selectively removed from cation exchange resin beads containing adsorbed calcium and magnesium ions by passing an aqueous sulfuric acid solution through a bed of the resin beads, the solution being specially formulated with respect to sulfuric acid concentration, and content of calcium and magnesium sulfate. More specifically, the eluting solution has an $H_2SO_4$ concentration of from 20 to 45% and is saturated with calcium sulfate while being substantially below $MgSO_4$ saturation. When a solution of this character is passed through the resin bed, an equilibrium condition can be reached in which there is an ion exchange equilibrium with respect to the adsorbed magnesium and the magnesium in solution. At the same time, there is an exchange of hydrogen for calcium, the eluted calcium increasing the concentration in the solution to a supersaturated calcium sulfate concentration. The supersaturated solution is then passed rapidly to a crystallizer and the $CaSO_4$ precipitated therein. The supernatant solution from the crystallizer can be recycled for further calcium elution. Most of the calcium may be removed in this manner while leaving the magnesium on the resin. The magnesium can then be removed from the resin by elution with aqueous sulfuric acid, which is preferably of relatively high concentration, such as 20 to 70% $H_2SO_4$. The resin can thereby be fully regenerated with removal of substantially all of the magnesium and calcium for reuse in a cation exchange process such as the removal of magnesium and calcium from phosphate rock-derived phosphoric acid.

Further features and advantages of the method of this invention are set out in the following detailed description.

THE DRAWING

In the accompanying drawing,

FIG. 1 is a diagrammatic flow sheet illustrating a preferred embodiment of the method of this invention for selective sequential removal of calcium and magnesium from a cation exchange resin having these ions adsorbed thereon.

DESCRIPTION OF PREFERRED EMBODIMENTS

Figure 1:
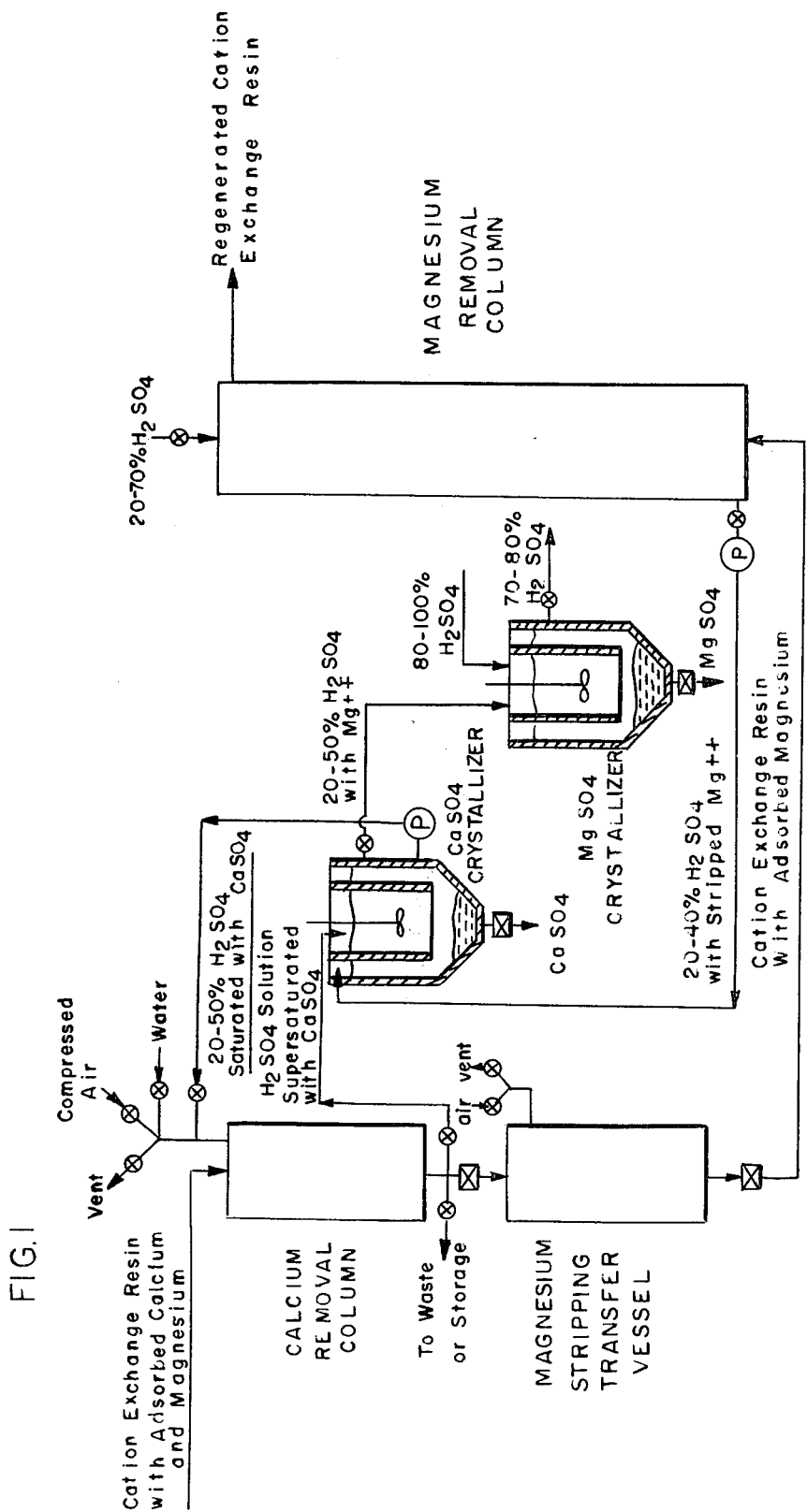

The method of this invention can be applied to any cation exchange resin containing adsorbed calcium and magnesium ions or other ions. Further, if desired the resin beads may be treated in the same bed used for the adsorption of the calcium and magnesium, and the sequence of calcium and magnesium removal steps may be carried out while maintaining the resin as a stationary bed. However, the method is particularly adapted for use in conjunction with moving folded bed cation exchange systems used for the removal of calcium and magnesium from phosphoric acid containing excess amounts of these ions, such as phosphoric acid prepared from phosphate rock containing high levels of magnesium. One particularly desirable system for use in conjunction with the method of this invention is described in the application filed on even date with the present application entitled "Method and Apparatus for Folded Moving Bed Ion Exchange System". Both that application and the present one having a common assignee, American Petro Mart, Inc., of Bartow, Fla. The cation exchange resin may be a strong acid-type resin, such as the polystyrene base, nuclear sulfonic resins, or the phenolic methylene sulfonic resins, or a weak acid cation exchange resin, such as the carboxylic resins.

The content of calcium and magnesium on the resin and their relative proportions is not critical. However, loaded resins ready for regeneration will usually contain the adsorbed metal ions corresponding to about 50 to 80% of the theoretical ion exchange capacity of the resin. The method of this invention can be applied to cation exchange resins containing more calcium than magnesium, more magnesium than calcium, or approximately equal molar proportions. For example, in one embodiment, the loaded resins obtained in the processing of phosphoric acid to remove magnesium and calcium may contain from 5 to 15 moles of magnesium per mole of calcium, and may contain 10 moles or more of magnesium per mole of calcium. The preliminary step, therefore, removing the calcium, effects only a proportionately small regeneration of the resin, the major portion of the regeneration occurring during the subsequent elution of the magnesium.

In the first step of the process of this invention, the cation exchange resin containing adsorbed calcium and magnesium ions is treated by passing an aqueous sulfuric acid solution through a bed of the resin beads for selective removal of calcium therefrom. To accomplish this result, it is preferred to employ a sulfuric acid solution having a concentration of from 20 to 50% by weight. (All $H_2SO_4$ concentrations set out herein are intended to be by weight.) Advantageously, the concentration can range from 20 to 50% $H_2SO_4$. Further, the solution should be saturated with calcium sulfate and undersaturated with magnesium sulfate. This is easy to accomplish, since calcium sulfate has a relatively low solubility in dilute solutions of sulfuric acid, such as 20 to 50% $H_2SO_4$, while magnesium sulfate has a relatively high solubility therein.

The temperature of the selective eluting solution is not particularly critical. Usual ambient temperatures can be employed, such as 70° to 100° F. More generally, suitable temperatures can range from 60° to 150° F., and under some conditions, higher or lower temperatures can be used although not required or particularly advantageous.

In accordance with the present invention, the initial eluting solution, as described above, is passed through the calcium and magnesium containing resin bed until an ion exchange equilibrium is obtained with respect to the magnesium. Such equilibrium can be easily maintained where the system is operated on a steady state recycle basis, that is, with recycle of the eluting solution after the precipitation of calcium sulfate therefrom, as will subsequently be described.

As the eluting solution passes through the resin, it becomes supersaturated with calcium sulfate, and is removed from the bed in this condition and passed to a crystallizer. In the crystallizer, the calcium sulfate is precipitated, and the residual supernatant solution, being saturated with calcium and being at the desired sulfuric concentration, is recycled to the calcium removal unit, which may be a column containing the bed of cation exchange resin. As required, makeup sulfuric acid can be added to the supernatant from the crystallizer. For example, this may be the sulfuric acid solution discharged from the bottom of the magnesium removal column. This column eluate may contain 20 to 40% $H_2SO_4$ together with the stripped magnesium. For steady state equilibrium operation, it will be understood that the eluting solution comprising the supernatant from the crystallizer, either with or without added sulfuric acid, should be recycled at a substantially constant sulfuric acid concentration, such as, for example, a 30% concentration.

It will usually not be possible to remove all of the calcium. In general, however, it is preferred to remove at least 50% and preferably at least 75% of the adsorbed calcium. The passing of the eluting solution through the resin bed can continued until as much as 90% or more of the calcium is eluted while at the same time leaving most of the magnesium on the resin.

After removal of the calcium, the magnesium is removed from the resin beads to complete the regeneration of the cation exchange resin. This can be done in the same bed or column as the calcium removal, or the resin can be transferred to a magnesium removal column, as is preferred, when the method is used in conjunction with a moving folded bed system. The magnesium can be removed by using aqueous sulfuric acid. For the magnesium removal, the concentration may range from 15 to 60% $H_2SO_4$. Preferably, however, the eluting solution has a relatively high concentration of sulfuric acid, such as a concentration from about 40 to 60%. This concentration reduces the amount 80–100% $H_2SO_4$ and oleum used and the amount of 70 to 80% $H_2SO_4$ produced in the $MgSO_4$ crystallizer. When an eluting solution of this concentration is introduced into the top of the magnesium removal column, the $H_2SO_4$ concentration will gradually decrease as the eluting solution percolates through the bed, so that the concentration of the eluate as removed from the column can be in the range of 20 to 50% $H_2SO_4$. This solution containing the stripped magnesium can be passed to the calcium sulfate crystallizer for admixture with the eluate from the calcium removal column, and thereby maintaining the desired concentration of the sulfuric acid for recycle from the calcium sulfate crystallizer to the calcium removal column.

In addition to the recycle from the calcium sulfate crystallizer to the calcium removal column, supernatant will be removed for precipitation of the magnesium. Supernatant is transferred to a magnesium sulfate crystallizer in which the concentration of sulfuric acid is increased to a concentration above the saturation solubility of the $MgSO_4$. For example, when the supernatant is transferred at a concentration of from 20 to 50% $H_2SO_4$, concentrated sulfuric acid (80 to 95%) can be added to increase the crystallizer concentration to a range of about 70 to 80% $H_2SO_4$. At such high sulfuric acid concentrations, the solubility of the magnesium sulfate is greatly reduced, and the magnesium sulfate precipitates. Supernatant solution after removal of the precipitated magnesium sulfate can be reused, for example, by dilution to the concentration desired for introduction into the magnesium removal column, or it can be used elsewhere in the operation of a plant producing phosphoric acid from phosphate rock.

DESCRIPTION OF FLOW SHEET

Referring now to FIG. 1, there is shown an illustrative embodiment of the process of this invention. The calcium removal column comprises a receiver for the cation exchange resin with adsorbed calcium and magnesium transferred from the loading column, such as that of a moving folded bed ion exchange system for adsorption of magnesium and calcium from aqueous phosphoric acid. As indicated in FIG. 1, the top of the column is connected through suitable conduits and valves to a vent, a source of compressed air, and a source of water. The bottom of the column is connected through appropriate valves, as indicated in the drawing, to an outlet to waste or storage, to an outlet connected to the CaSO4 crystallizer, and through a resin transfer valve to a magnesium stripping transfer vessel comprising a pulse chamber used for transferring resin increments into the bottom of the magnesium removal column.

The resin transferred to the calcium removal column may be first subjected to a purge with compressed air to remove free phosphoric acid and then washed with water before being subjected to calcium removal. Then with the valve open on the line to the calcium sulfate crystallizer, the pump is started which transfers solution from the crystallizer through the valve-controlled line to the top of the calcium removal column. For example, this solution may comprise 20 to 50% $H_2SO_4$ saturated with calcium sulfate and being less than 50% saturated with magnesium sulfate. The operation of the pump is continued while the solution is passed downwardly through the bed of the cation exchange resin. As previously described, the magnesium in the solution is substantially in ion exchange equilibrium with the adsorbed magnesium while an exchange of hydrogen for the adsorbed calcium takes place resulting in the solution becoming supersaturated with calcium sulfate. In the crystallizer, the calcium sulfate is precipitated, thereby reducing the supernatant solution to a substantially saturated condition. As shown, the crystallizer may comprise a vertically-extending vessel having a cylindrical baffle in the upper central portion provided with an agitator for promoting the crystallization. The supersaturated solution is introduced into the central portion of the crystallizer enclosed by the baffle, as indicated by the arrow in FIG. 1. The crystallizer can provide a lower conical portion within which the precipitated calcium sulfate collects. The precipitate can be periodically removed through a suitable solids-transfer valve, and this removal may be promoted by use of a suitable pump. The supernatant solution for recycle can be removed, as shown from the outer portion of the crystallizer. Similarly, the supernatant solution for transfer to the magnesium sulfate crystallizer can be removed from the outer portion of the crystallizer, as indicated in the diagram of FIG. 1. It should be understood, however, that the operation of the method of this invention does not require any special crystallizer apparatus, and that standard crystallizers or similar equipment can be used. Where required, especially at startup, calcium sulfate crystals can be added to the calcium sulfate crystallizer to promote the crystallization.

The supernatant solution transferred to the magnesium sulfate crystallizer, such as 20 to 50% $H_2SO_4$ containing magnesium below saturation, can be introduced into the central portion of a crystallizer similar to that described for the calcium sulfate crystallization. As shown, it includes a cylindrical baffle surrounding the central portion which is provided with an agitator for promoting the crystallization. Concentrated sulfuric acid, such as 80 to 95% $H_2SO_4$, can also be introduced into the baffle enclosed central portion of the crystallizer to raise the sulfuric acid concentration to the level required for effective precipitation of the magnesium sulfate, such as 70 to 80% $H_2SO_4$. Magnesium sulfate crystals can be added to promote the crystallization, but will usually not be required. The precipitated $MgSO_4$ collects in the conical bottom portion of the crystallizer, as shown, and is periodically removed therefrom through a suitable solids-removal valve, and a pump may be used to assist the solids withdrawal. These details, however, are not part of the present invention.

After the calcium has been substantially removed from the resin in the calcium removal column, the flow of the eluting solution through the resin is discontinued, and compressed air introduced to remove liquid from the column and the valves between the calcium removal column and the calcium sulfate crystallizer are closed. The resin transfer valve between the calcium removal column and the magnesium stripping transfer vessel is then opened. If required, a sulfuric acid solution similar to that discharged from the bottom of the magnesium removal column can be introduced into the calcium removal column to fluidize the resin and promote its transfer to the magnesium stripping transfer vessel. Compressed air may then be introduced into the magnesium stripping transfer vessel above the resin and liquid therein. With the resin compacted in the bottom of the transfer vessel and under air pressure, the resin transfer valve between the transfer vessel and the bottom of the magnesium removal column is opened to permit the transfer of a compacted increment of the resin into the bottom of the magnesium removal column. The introduction of the resin increment into that column causes the discharge of an increment of similar volume from the top of the column, the discharged increment at that point comprising the regenerated cation exchange resin.

In the operation of the magnesium removal column, 20 to 70% $H_2SO_4$ can be introduced into the top of the column flowing downwardly through the resin therein, which extends in packed condition from the bottom to the top of the column. As the magnesium is replaced by the hydrogen of the acid, the hydrogen concentration of the eluting solution gradually decreases while the magnesium concentration increases. The eluate solution removed from the bottom of the column through a suitable valve controlled circuit can be passed directly to the calcium sulfate crystallizer, as shown in the diagram of FIG. 1. It can comprise 20 to 60% $H_2SO_4$ containing the stripped magnesium, which at that sulfuric acid concentration will be below its saturation concentration. The regenerated cation exchange resin as discharged from the top of the magnesium removal column is ready for process reuse, such as for return to a loading column in which the regenerated resin is contacted with the raw phosphoric acid from which the magnesium and calcium is to be removed.

PROCESS EXAMPLE

Cation exchange resin loaded with calcium and magnesium, and containing phosphoric acid, is introduced into a calcium removal chamber by pulsing transfer from a phosphoric acid treatment column. Compressed air is introduced and the liquid phosphoric acid is removed through a valve at the bottom of the chamber. A series of countercurrent washes, each containing less $P_2O_5$ than the previous, ending with fresh water, is introduced, followed by a drain step with compressed air blown through the resin. The resin, thus freed of $P_2O_5$, is then rapidly washed with 30% $H_2SO_4$ saturated with $CaSO_4$, containing 1.5–2.0% MgO. The relatively high acid strength allows this solution to elute calcium from the resin despite its state of saturation in the solution, forming a temporarily supersaturated condition. This solution is returned to the precipitator from whence it came, entering the agitated control area, where it contacts $CaSO_4$ in suspension, which facilitate precipitation and the removal of relatively large Xtals of CaSO₄, as the larger Xtals settle, despite the mild agitation, to the bottom of the cone, where they are removed. As the acid concentration decreases in this solution, 93% H₂SO₄ is added to maintain a 30% H₂SO₄ content.

Resin in the treatment chamber, now substantially reduced in calcium content, is transferred into the resin transfer vessel below, and later into the bottom of the magnesium removal column shown in FIG. 1. It is then contacted with regenerant solution during the approximated 7 cycles in which it remains in the major removal column. The regenerant, 50% H₂SO₄ introduced at the top, loses acid strength and gains in MgO content as it exchanges hydrogen for magnesium on the resin. Thus the magnesium content is relatively high when it exits the column at the bottom. This solution, with 20–50% H₂SO₄, 2% MgO, and trace amounts of CaO, is removed to the MgSO₄ precipitator. 93% H₂SO₄ is added until the solution has an H₂SO₄ content of 75% by weight, at which point MgSO₄ precipitates, and is removed from the bottom of the tank. The supernatant is removed for reuse from the top of the tank (0.1–0.2% MgO).

Resin from the top of the magnesium removal column, now substantially fully regenerated, is passed into the resin treatment chamber shown in FIG. 1. Entrained liquid is blown out through a valve at the bottom of the chamber and returned to the eluting solution tank from which it originated, being identical in makeup to this solution. A volume of 20–40% H₂SO₄ wash solution from the wash solution tank is pumped atop the resin, then blown through and out a valve at the bottom. This wash displaces much absorbed 50% H₂SO₄ from the resin, and exits with typical H₂SO₄ content of 45%. This is returned to the eluting solution makeup tank, where, with the addition of 65–75% H₂SO₄ from the MgSO₄ precipitator, it can make 50–75% of the 50% H₂SO₄ needed for regeneration. A second wash from the 20–40% H₂SO₄ was solution tank is used, returning to the same tank with somewhat increased H₂SO₄ content (30–35%). Fresh water is introduced, and the effluent from this wash, typically 5–20% H₂SO₄, is added to the tank.

We claim:

1. The method of selectively removing calcium from cation exchange resin beads containing adsorbed calcium and magnesium ions, comprising the steps of:
   (a) passing an aqueous sulfuric acid (H₂SO₄) solution through a bed of said resin beads, said solution having an H₂SO₄ concentration of from 20 to 50% by weight, being saturated with calcium sulfate (CaSO₄), and containing magnesium sulfate (MgSO₄) at a concentration substantially below saturation;
   (b) continuing to pass said solution through said resin bed until the adsorbed magnesium is in ion exchange equilibrium with the magnesium in solution while simultaneously exchanging the hydrogen ions in solution for the adsorbed calcium ions, said solution becoming supersaturated with calcium sulfate; and
   (c) passing the said supersaturated solution to a crystallizer and precipitating CaSO₄ therein.

2. The method of claim 1 in which said H₂SO₄ solution has an H₂SO₄ concentration of from about 25 to 40% by weight.

3. The method of claim 1 in which said method steps are continued until at least 50% of the adsorbed calcium is removed from said resin.

4. The method of claim 1 in which the H₂SO₄ solution in said crystallizer after said precipitation of CaSO₄ therefrom is recycled to said resin bed and passed therethrough.

5. The method of claim 1 in which said resin beads after said removal of calcium therefrom are eluted with aqueous sulfuric acid having an H₂SO₄ concentration of from 20 to 70% by weight to remove the adsorbed magnesium therefrom.

6. The method of selectively removing calcium from cation exchange resin beads containing adsorbed calcium and magnesium ions, comprising the steps of:
   (a) passing an aqueous sulfuric acid (H₂SO₄) solution through a bed of said resin beads, said solution having an H₂SO₄ concentration of from 25 to 40% by weight, being saturated with calcium sulfate (CaSO₄), and containing magnesium sulfate (MgSO₄) at a concentration substantially below saturation;
   (b) continuing to pass said solution through said resin bed until the adsorbed magnesium is in ion exchange equilibrium with the magnesium in solution while simultaneously exchanging the hydrogen ions in solution for the adsorbed calcium ions, said solution becoming supersaturated with calcium sulfate, said calcium removal being continued until at least 75% of the adsorbed calcium is removed from said resin;
   (c) passing the said supersaturated solution to a crystallizer and precipitating CaSO₄ therein; and
   (d) recycling the H₂SO₄ solution in said crystallizer after said precipitation of CaSO₄ therefrom through said resin bed for further removal of adsorbed calcium.

7. The method of claim 6 in which said resin beads after said removal of calcium therefrom are eluted with aqueous sulfuric acid having an H₂SO₄ concentration of from 20 to 70% by weight to remove the adsorbed magnesium therefrom.

8. The method of selectively removing calcium from cation exchange resin beads containing adsorbed calcium and magnesium ions, comprising the steps of:
   (a) passing an aqueous sulfuric acid (H₂SO₄) solution through a bed of said resin beads, said solution having an H₂SO₄ concentration of from 20 to 50% by weight, being saturated with calcium sulfate (CaSO₄), and containing magnesium sulfate (MgSO₄) at a concentration substantially below saturation;
   (b) continuing to pass said solution through said resin bed until the adsorbed magnesium is in ion exchange equilibrium with the magnesium in solution while simultaneously exchanging the hydrogen ions in solution for the adsorbed calcium ions, said solution becoming supersaturated with calcium sulfate;
   (c) passing the said supersaturated solution to a crystallizer and precipitating CaSO₄ therein;
   (d) recycling the H₂SO₄ solution in said crystallizer after said precipitation of CaSO₄ therefrom through said resin bed for further removal of adsorbed calcium, said recycling being continued until at least 75% of the adsorbed calcium has been removed while leaving the adsorbed magnesium in said beads;

(e) next eluting the magnesium from said resin beads from which the calcium has been removed by passing an aqueous sulfuric acid solution therethrough having an $H_2SO_4$ concentration of from 20 to 70% by weight to obtain an eluate containing $MgSO_4$ at below saturation; and (f) thereafter precipitating the magnesium from said eluate by increasing the $H_2SO_4$ concentration thereof to a concentration above the saturation solubility of the $MgSO_4$.

* * * * *